United States Patent [19]
Coons et al.

[11] Patent Number: 5,953,637
[45] Date of Patent: Sep. 14, 1999

[54] TIME SLOT RECOVERY FOR REMOTE IN-BAND TRANSLATOR IN TIME DIVISION MULTIPLE ACCESS WIRELESS SYSTEM

[75] Inventors: David D. Coons, Satellite Beach; Thomas R. Schmutz, Melbourne, both of Fla.

[73] Assignee: AirNet Communications Corporation, Melbourne, Fla.

[21] Appl. No.: 08/772,181

[22] Filed: Dec. 20, 1996

[51] Int. Cl.[6] ....................................................... H04B 7/15
[52] U.S. Cl. ...................... 455/11.1; 455/67.4; 455/67.6; 370/324; 370/519
[58] Field of Search .................................... 455/561, 562, 455/550, 422, 445–449, 11.1, 24, 517, 524, 502, 423, 67.1, 67.4, 67.6, 9, 553; 370/315, 321, 328, 337, 324, 347, 350, 442, 478, 503, 519; 375/356

[56] References Cited

U.S. PATENT DOCUMENTS

| | | |
|---|---|---|
| 4,550,443 | 10/1985 | Freeburg . |
| 4,727,590 | 2/1988 | Kawano et al. . |
| 4,850,032 | 7/1989 | Freeburg . |
| 5,038,399 | 8/1991 | Bruckert . |
| 5,095,528 | 3/1992 | Leslie et al. . |
| 5,142,691 | 8/1992 | Freeburg et al. . |
| 5,152,002 | 9/1992 | Leslie et al. . |
| 5,247,699 | 9/1993 | Hartman . |
| 5,355,520 | 10/1994 | Freeburg et al. . |
| 5,404,570 | 4/1995 | Charas et al. . |
| 5,537,680 | 7/1996 | Bruno . |
| 5,544,171 | 8/1996 | Godecker . |
| 5,668,804 | 9/1997 | Suonvieri ................................. 370/519 |

FOREIGN PATENT DOCUMENTS

| | | |
|---|---|---|
| 2128810 | 7/1994 | Canada . |
| WO 94/11957 | 5/1994 | WIPO . |

OTHER PUBLICATIONS

Supplemental Product Information of 3dbm, Inc.,*HPT Series 6–Channel High–Power Cell Site Expander* pp. 1–25.

Advertisement: Alcatel, "Extended Cells Improve Rural GSM Coverage" *Mobile Communications International*, p.A8, Sep./Oct. 1995.

Advertisement: 3dbm,Inc. HPT Series, "High Power Cell Site Expander".

Advertisement: Allen Telecom Group Systems "PMR–722GC1 Sector–Extender Repeater".

*Primary Examiner*—Doris H. To
*Attorney, Agent, or Firm*—Farkas & Manelli PLLC; Russell O. Paige

[57] ABSTRACT

In a conventional Time Division Multiple Access (TDMA) wireless system, the specified distance between a mobile unit and the base transceiver system (BTS) cannot exceed predetermined distances because of time slot synchronization constraints. In this approach to extending TDMA system coverage, in-band translator components are located in the center of remote cells which would normally contain a base transceiver system (BTS). The in-band translators include a loop back circuit that permits a host BTS to measure the propagation time delay by sending test access signals between the host BTS and each in-band translator. The measurements are then used to adjust a time delay in an uplink signal as received from each in-band translator by the BTS in normal operation.

8 Claims, 6 Drawing Sheets

TIME SLOT RECOVERY FOR REMOTE IN-BAND TRANSLATOR IN TIME DIVISION MULTIPLE ACCESS WIRELESS SYSTEM

FIELD OF THE INVENTION

This invention relates generally to wireless communication systems and in particular to time synchronization correction of an in-band translator deployed in peripheral cells to extend the range of a Base Transceiver System (BTS).

BACKGROUND OF THE INVENTION

The need for wireless communication services, such as Cellular Mobile Telephone (CMT), Personal Communication Services (PCS) and the like, typically requires the operators of such systems to serve an ever increasing number of users. As a result, certain types of multichannel broadband Base Transceiver Systems (BTSs) have been developed which are intended to service a relatively large number of active mobile stations in each cell. Such broadband BTS equipment can typically service ninety-six simultaneously active mobile stations, at a cost of less than $2000 to $4000 per channel.

While this equipment is cost effective to deploy when a relatively large number of active mobile stations is expected in each cell, it is not particularly cost effective in most other situations. For example, during an initial system build out phase, a service provider does not actually need to use large numbers of radio channels. As a result, the investment in broadband multichannel radio equipment may not be justified until such time as the number of subscribers increases to a point where the channels are busy most of the time.

Some have proposed various techniques for expanding the service area of a master cell site. For example, the HPT Cell Site Expander product manufactured by 3 dbm, Inc., of Camarillo, Calif., consists of a base station translator which samples downlink signal traffic and translates it to a selected offset frequency. The offset carrier is transmitted to an expansion cell site via directional antennas. At the expansion cell site, the carrier is translated back to the original cellular channel and transmitted throughout the expansion cell site coverage area such as via an omnidirectional antenna. In the uplink direction, a cellular signal received by the expansion cell site from a mobile unit is translated and then transmitted back to the base station translator, which in turn translates the signal back to its original carrier frequency.

However, such a device is designed only for use with analog-type cellular systems. A specific problem is encountered when attempting to extend the service area of a base station that uses Time Division Multiple Access (TDMA) signaling. Such a system makes use of a technique in which multiple voice or data channels are provided by dividing the access to each radio carrier frequency into carefully synchronized time slots. In order to properly demodulate a TDMA signal at the base station, a timing advance must be taken into consideration for each radio pulse received from the mobile stations. The timing advance serves to compensate for the differences in signal propagation time since the distance to the base station is different for each mobile station.

A TDMA signal transmitted in the uplink direction must therefore arrive at the Base Transceiver System with proper time alignment. If this is not the case, the signal pulses from the various mobile stations will collide, and it will not be possible for the Base Transceiver System to properly demodulate the signals. As such, it has in most instances been necessary to limit the nominal radius of a TDMA cell so that proper time alignment may be maintained.

An approach to extending the radius of a TDMA cell was disclosed in U.S. Pat. No. 5,544,171, issued to Goedecker and assigned to Alcatel N.V. This technique uses a fixed Base Transceiver System (BTS) that includes both a standard TDMA radio receiver and an additional auxiliary TDMA receiver. The auxiliary TDMA receiver receives and compensates the TDMA radio pulses from mobile stations located outside of the nominal cell radius. In this manner, interference between the TDMA signals received from a mobile station located outside of the nominal cell radius and a mobile station located within the nominal radius is avoided.

Unfortunately, the Goedecker technique is intended for use where both radio transceivers can be located entirely within the base station site. This permits the timing signals for the auxiliary TDMA receiver to be directly connected to the timing signals for the standard TDMA receiver. Thus, it would not be possible to directly apply the Goedecker technique to a remote repeater or translator arrangement, where the auxiliary TDMA receiver would have to be located many miles away from the base station site and such timing signal connection would not be possible.

Furthermore, while the HPT and Goedecker designs can be used to extend the radius of a single cell, they do not appear to suggest how to synchronize TDMA signals received from multiple mobile stations located in multiple cells simultaneously.

DESCRIPTION OF THE INVENTION

Objects of the Invention

It is an object of this invention to extend the available range in a cellular communication system beyond that which is normally available with Time Division Multiple Access (TDMA) air interfaces.

Another object is to provide for time delay compensation in TDMA systems without using multiple auxiliary receivers.

A further object is to compensate for the delay associated between a translating receiver deployed in a remote outlying cell and a host base station.

Yet another object is to provide for remote receiver time delay compensation in an uplink direction by measuring a delay observed in a downlink direction.

SUMMARY OF THE INVENTION

Briefly, the invention is an architecture for a wireless communication system in which the cells are grouped into clusters. A host cell location is identified within each cluster and a multichannel Base Transceiver System (BTS) is located at or near the host cell site.

Rather than deploy a complete suite of base station equipment at each remaining cell in the cluster, translating radio transceivers are located in the remote cells. These translating radio transceivers operate in-band, that is, within the frequencies assigned to the service provider.

The in-band translators operate in both an uplink and downlink direction. That is, signals transmitted by a mobile station located in a remote cell are received at the in-band translator, translated to a different carrier frequency, and then transmitted to the host BTS. Likewise, signals transmitted by the host BTS are first received by the in-band translator, translated to a different carrier frequency, and then repeated out to the mobile stations.

In accordance with the invention, the host BTS measures a time delay for each in-band translator channel during a calibration mode. This is accomplished by setting the in-band translator to a loop back mode whereby the downlink signal received from the host BTS is looped an intermediate frequency (IF) signal chain back to the uplink transmit path. A timing test signal in the form of, for example, an access burst is then transmitted by the host BTS such as would normally be sent by a mobile station. The access burst is received by the in-band translator and looped back to the host BTS. The host BTS then demodulates the looped back signal. A resulting time of arrival delay estimate as measured in the downlink path is then used by the host BTS to compensate for time alignments to be made in the time slots in the uplink signal during normal operation.

As a result, the limitation on the range of the cell site normally associated with Time Division Multiple Access protocols is avoided. Indeed the range of such a system is limited only by the expected attenuation in the radio link.

BRIEF DESCRIPTION OF THE DRAWINGS

For a more complete understanding of the invention and its novel advantages and features, reference should be made to the accompanying drawings in which.

DETAILED DESCRIPTION OF THE PREFERRED EMBODIMENT

Figure 1:
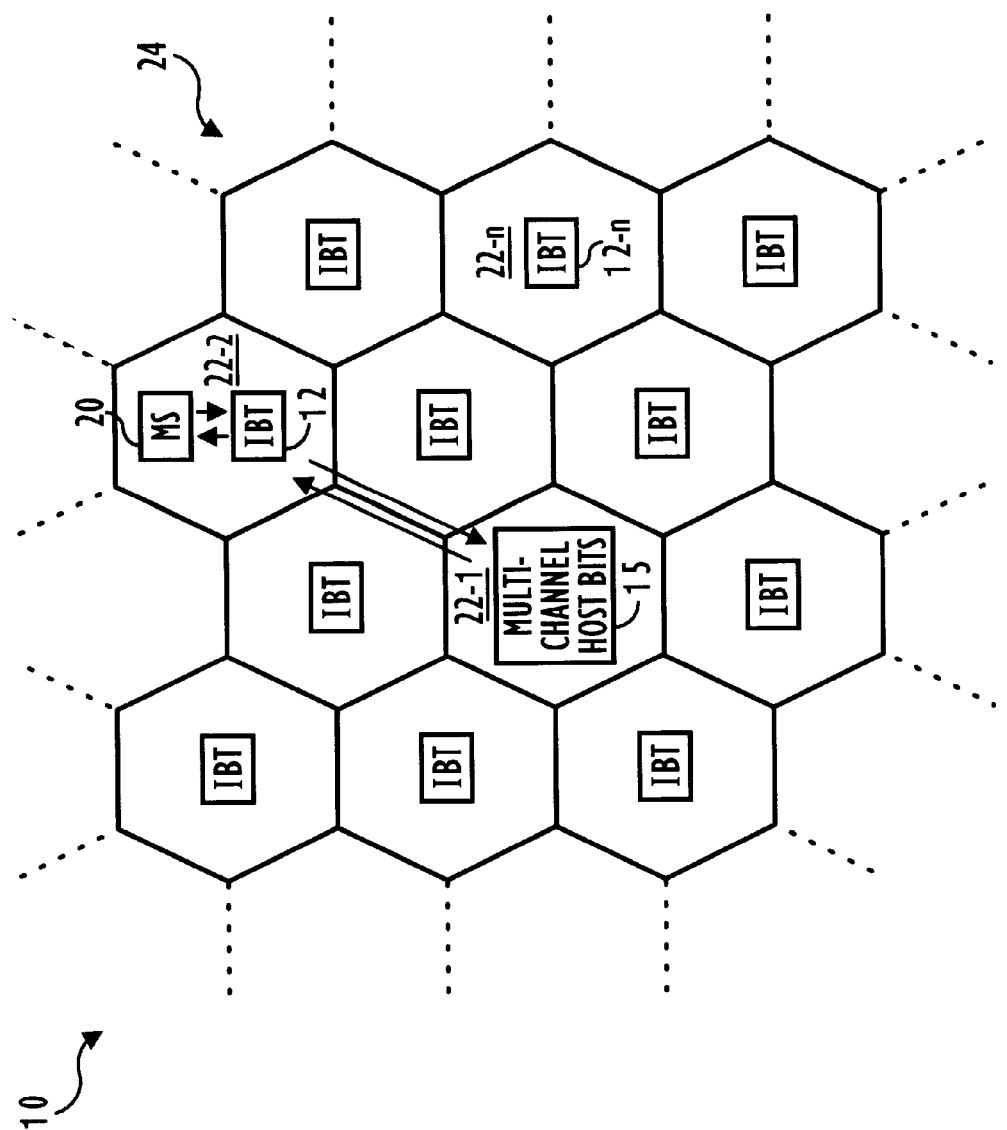
FIG. 1 is a view of a cell site cluster showing how a host Base Transceiver System (BTS), in-band translators, and mobile stations are deployed according to the invention.

FIG. 1 illustrates a wireless communication system 10 such as a Cellular Mobile Telephone, Personal Communication System (PCS), or similar system in which a timing adjustment scheme according to the invention enables proper demodulation signals received from in-band frequency translator base stations deployed in peripheral cells.

The system 10 provides voice and or data communication between mobile stations 20 and a Public Switched Telephone Network (PSTN) via radio signals. In the particular embodiment of the invention being described, the radio signaling protocol, or "air interface", uses a Time Division Multiple Access (TDMA) technique such as the PCS-1900 standard promulgated by the Telecommunications Industry Association (TIA) in the United States [which is identical in relevant aspects to the Global System for Mobile Communication (GSM) standard promulgated in Europe and elsewhere by the European Telecommunication Standards Institute (ETSI)].

The in-band translators 12-1, 12-2, . . . , 12-n (also referred to herein as the "range extenders") are each located in what is normally to be approximately the center of a cell site 22 among a group or cluster 24 of cells. The in-band translators 12 receive radio signals from the mobile stations 20 located in their respective cells 22 and forward these signals to the associated host Base Transceiver System (BTS) 15. Likewise, radio signals originating at the host BTS 15 are forwarded by the translators 12 to the mobile stations 20. As a result, the signals associated with all of the mobile stations 20 located within the cluster 24 of cells 22-1, . . . , 22-n are thereby processed at the host BTS 15.

The in-band translators 12 are "base stations" in the sense that they are each associated with a particular cell 22 and in that they each receive and transmit multiple signals from and to the mobile stations 20. However, the in-band translators 12 do not perform demodulation and modulation functions as does a conventional base station radio. Rather, they serve only to perform an in-band frequency-translation on signals received from the mobile stations 20 and then direct such signals on a different frequency to the host BTS 15. The in-band translators 12 also perform the inverse function, to frequency translate signals received from the host BTS 15-1 and then direct them to the mobile stations 20. The specific manner of translation will be discussed below in connection with FIG. 4.

Figure 2:
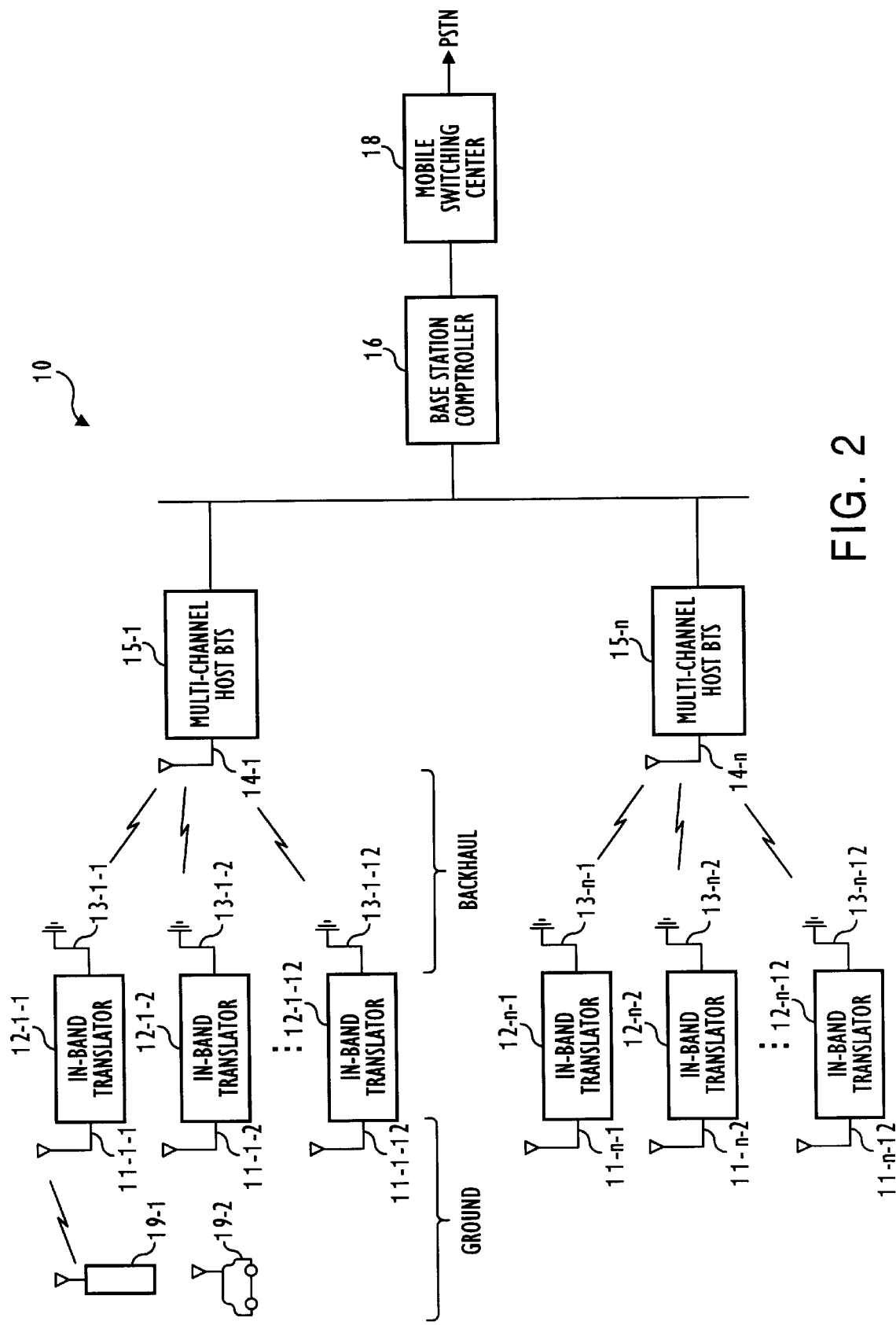
FIG. 2 is a block diagram of the components of the system.

Turning attention now to FIG. 2, the system 10 more particularly includes translator omni-directional antennas 11-1, . . . , 11-n-2, 11-n-1, 11-n (collectively, the omni-directional antennas 11), in-band translator base stations (range extenders) 12-1-1, . . . , 12-n-1, . . . , 12-n-12, translator directional antennas 13-1, . . . , 13-n, host base station antennas 14-1, . . . , 14-n, multichannel host Base Transceiver Systems (BTSs) 15-1, . . . 15-n, one or more base station controllers 16, a mobile switching center 18, and mobile stations 20-1, 20-2.

The host BTSs 15-1, . . . , 15-n are responsible for demodulating radio signals as well as for connecting such signals to the Public Switched Telephone Network (PSTN) through the mobile exchange 17. The host BTSs 15-1, 15-n also modulate signals received from the PSTN through the mobile switching center 18 to format them for transmission over the air through the in-band translators 12. A particular host BTS 15-1 serves the multiple in-band translators 12-1-1, 12-1-2, . . . , 12-1-n associated with a given cluster 24 of cells 22.

The Base Station Controller (BSC) 16, of which there may be more than one, has a number of functions. The primary function is to manage the logical connections made between mobile stations 20 and the PSTN. In order to do so, the Base Station Controller 16 assigns transmit and receive radio carrier frequencies to each individual mobile station 20, in-band translator 12, and host BTS 15. Typically, there may be five to twenty BTSs 15-1, . . . , 15-n serviced by a single Base Station Controller 16.

Figure 3:
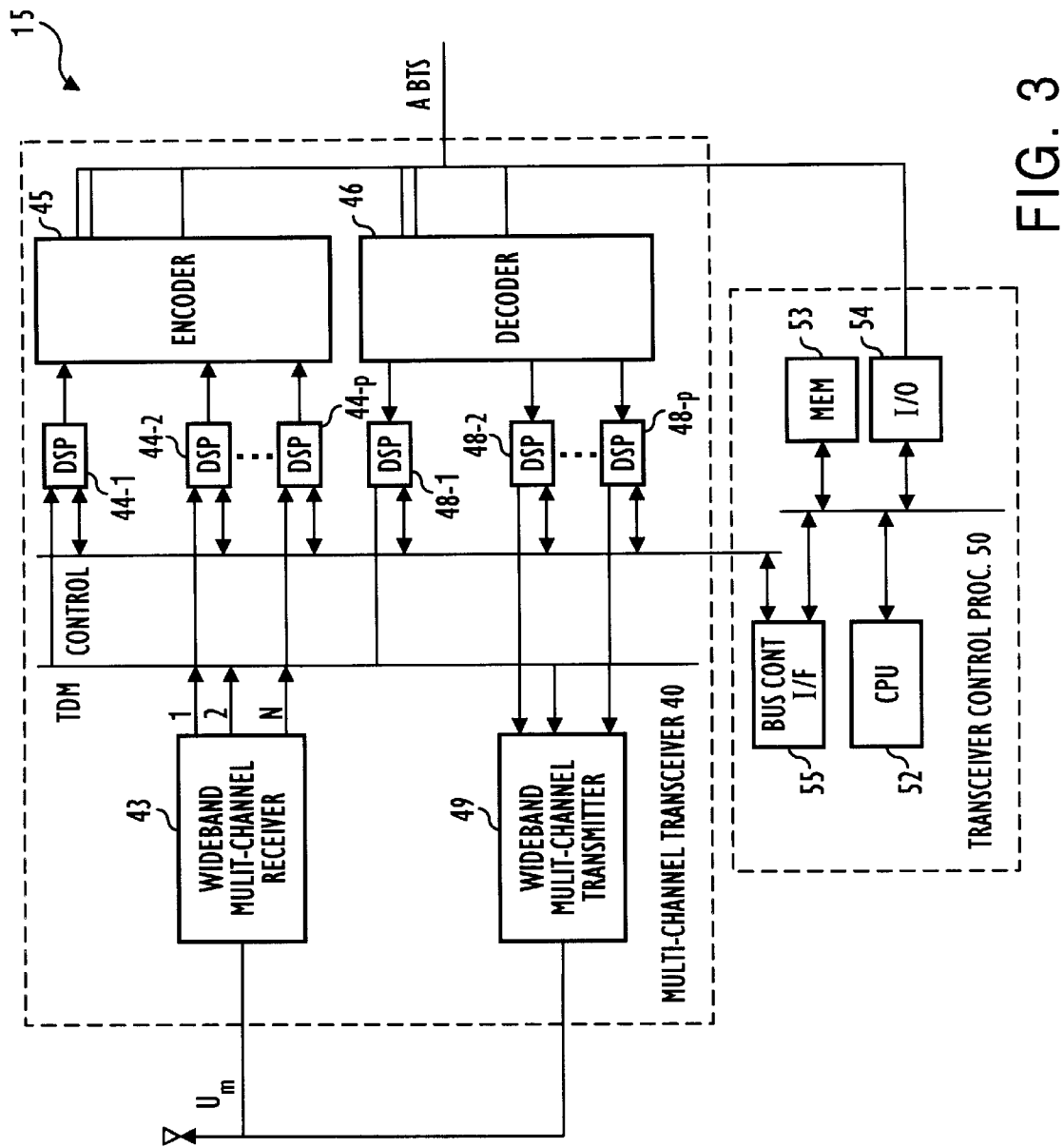
FIG. 3 is a detailed block diagram of a preferred embodiment of the multichannel host Base Transceiver System (BTS)

Turning attention now to FIG. 3, an exemplary host Base Transceiver System (BTS) 15 consists of a broadband transceiver portion 40 and transceiver control processor 50. The transceiver portion 40 acts as the interface for the radio channels Um, and preferably includes broadband radio receiver and transmitter equipment to provide access to a number of contiguous receive and transmit channels simultaneously. The transceiver control processor 50 coordinates the operation of the transceiver portion 40 according to commands received from the Base Station Controller (BSC) 16 over an interface known as the Abis interface.

The broadband multichannel receiver 45 and transmitter 49 are broadband in the sense that they cover a substantial portion of the radio frequency bandwidth available to the service provider operating the system 10. For example, the broadband receiver 43 may downconvert a 5 MegaHertz (MHz) bandwidth in the 1900–2000 MHz range which contains as many as 25 radio carrier signals, each having an approximately 200 kiloHertz (kHz) bandwidth. Each such carrier signal may typically contain up to eight (8) PCS-1900 channel signals.

The transceiver portion 40 consists of a broadband multichannel receiver 43 and a broadband multichannel transmitter 49. The broadband multichannel receiver 43 in turn typically consists of a downconverter analog-to-digital (A/D) and one or more digital filter bank analyzers (not shown) which operate in a known manner to provide a plurality, N, of digital channel signals. A plurality of digital signal processors (DSPs) receive the digital channel signals and are programmed to operate as demodulators 44-1, 44-2, . . . , 44-p (collectively demodulator DSPs 44). The demodulator DSPs 44 are connected to the broadband multichannel receiver 43 via a Time Division Multiplex (TDM) bus, which permits any of the N receiver outputs to be connected to any demodulator DSP 44. The demodulator DSPs 44 each provide a demodulated radio signal at its output. An encoder 45 may be used to encode these outputs of the demodulator DSPs 44 into a suitable signaling format for transport over the Abis interface to the Base Station Controller (BSC) 16.

The transceiver 40 performs the reciprocal functions in the transmit direction. In particular, a decoder 46 and a plurality of modulator DSPs 48-1, 48-2, . . . , 48-p, each of which receive one of the channel signals at an input, provide a plurality, N, of modulated signals to the broadband multichannel transmitter 49. The broadband multichannel transmitter 49, which is also connected to the TDM bus, consists of a digital filter bank synthesizer and a digital-to-analog converter. The broadband multichannel transmitter combines the N modulated signals to produce a broadband composite signal for transmission.

The transceiver control processor 50 is a computer, such as a microcomputer, and includes a central processing unit (CPU) 52, a memory 53, an input/output (I/O) interface 54, and bus controller interface 55. The I/O interface 54 is used to receive control signaling from the BSC 16 over the Abis interface. To facilitate communication with the broadband transceiver 40, the transceiver control processor 50 makes use of the Time Division Multiplex (TDM) bus controller 55.

The bus controller 55 ensures that output from the broadband multichannel receiver 43 are inserted in a defined order to particular ones of the demodulator DSPs 44. Likewise, the bus controller 55 ensures that outputs of the modulator DSPs 48 are asserted in the defined order to the N inputs of the broadband multichannel transmitter 49. The bus controller 55 accomplishes this in a known fashion by using a bus time slot counter and time slot memory circuits to determine the order of connections.

A co-pending United States patent application entitled "Transceiver Apparatus Employing Wideband FFT Channelizer with Output Sample Timing Adjustment and Inverse FFT Combiner for a Multichannel Communication Network" filed Apr. 8, 1994 and which is assigned to AirNet Communications Corporation, the assignee of this application, describes the details of several embodiments of the multichannel BTS 15.

Figure 4:
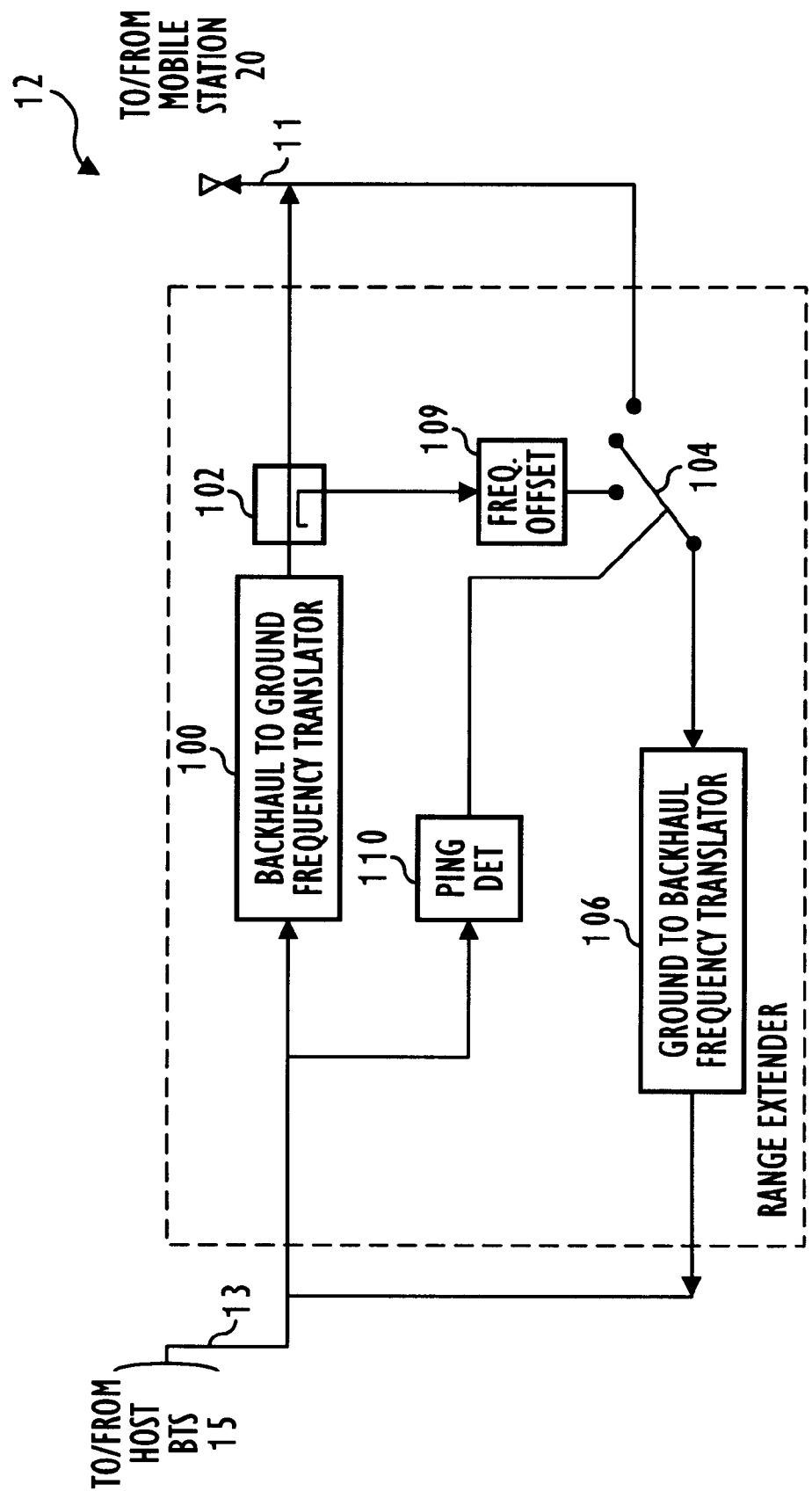
FIG. 4 is a block diagram of the in-band translator (or range extender)

FIG. 4 is a block diagram of the details of one of the in-band translators 12 according to the invention. The in-band translator 12 consists of an omni-directional antenna 11, a directional antenna 13, a backhaul-to-ground frequency translator 100, a directional coupler 102, a loop-back switch 104, a ground-to-backhaul frequency translator 106, a ping signal detector 110, a frequency shifter 109, and a diversity detector 108.

The backhaul-to-ground translator 100 receives signals from the directional antenna from the host BTS 15. The backhaul-to-ground translator 100 shifts the carrier frequency of such signals to a different frequency which is within the bandwidth of the frequency allocated to the operator of the system 10. In a PCS-1900 system, for example, signals may be received from the host BTS 15 in a range of, say, 1975–1990 MHz. As previously described, each signal is, a 200 kHz bandwidth signal. The signal is then frequency translated to a different carrier frequency in the 1975–1990 MHz bandwidth. The translated signal is then sent through the directional coupler 102 out to the omni-directional antenna 11, and from there, on to the mobile stations 20.

In the receive direction, radio carrier frequency signals received on the omni-directional antenna 11 from the mobile stations 20 are first passed to the loop back switch 104. In this normal mode of operation of the in-band translator 12, the loop back switch 104 is set to couple signals received at the omni-directional antenna 11 to the ground-to-backhaul frequency translator 106. The ground-to-backhaul translator 106 then performs a carrier frequency translation. For example, in the PCS 1900 band, signals may be received in a range from 1895–1910 MHz and shifted to a different carrier frequency in this bandwidth. The output from the ground-to-backhaul translator 106 is then connected to the directional antenna 13 for transmission back to the host BTS 15.

The ping signal detector 110 is arranged to detect an initiate loop back or "ping"signal as sent by the BTS 15. Upon first detecting the initiate loop back signal, the ping signal detector 110 causes the loop back switch 104 to be operated to connect signals received on the omnidirectional antenna through the backhaul to ground translator 100, the coupler 102, the loop back switch 104, and ground-to-backhaul translator 106. While the translator 12 is in this loop back mode, a frequency offset circuit 109 adjusts for the difference in the downlink and uplink carrier frequency. This offset is (1975 minus 1895) or 80 MHz in the PCS-1900 example being described herein.

When a subsequent terminate loop back signal is received by the ping signal detector 110, the loop-back switch 104 is operated to return the translator 12 to the normal mode.

In order to perform a time of arrival adjustment according to the invention, the in-band translator 12 having a loop-back mode is used in conjunction with the host BTS 15. In particular, the BTS control processor 52 (FIG. 3), includes a process that tracks of the activity for each in-band translator 12 which it controls.

The process proceeds generally as follows. When there has been no radio frequency signal transmitted to or by a mobile station 20 on the carrier frequency associated with a particular in-band translator 12 for a period of time, such as, for example, five (5) minutes, the control processor 52 sends a command to the transmit digital signal processor (DSP) 48 associated with that particular radio channel. That DSP 48 in turn causes the initiate loop back ping signal to be sent to the in-band translator 12. The ping signal may, for example, take the form of a constant baseband tone transmitted for a predetermined number of successive time slots. After waiting for a period of time sufficient to ensure that the in-band translator 12 has been placed into loop back mode, the DSP 48 then causes a timing test signal, such as a Random Access Control Channel (RACCH) burst to be sent to the translator 12. The corresponding receive DSP 44 is then initiated to detect the RACCH burst and to measure the time required for the RACCH burst to be looped back to the host BTS 15. In this manner, the host BTS 15 can determine an actual propagation time between the in-band translator 12 and the base station 15, by dividing the observed loop back time by two.

After determining the propagation time, the loop back termination signal (which may be in the form of a tone that is different from the initiate loop back tone) causes the ping return detector 110 to return the loop back switch 104 to the normal mode. The process may be repeated and measurements averaged if desired.

Figure 5:
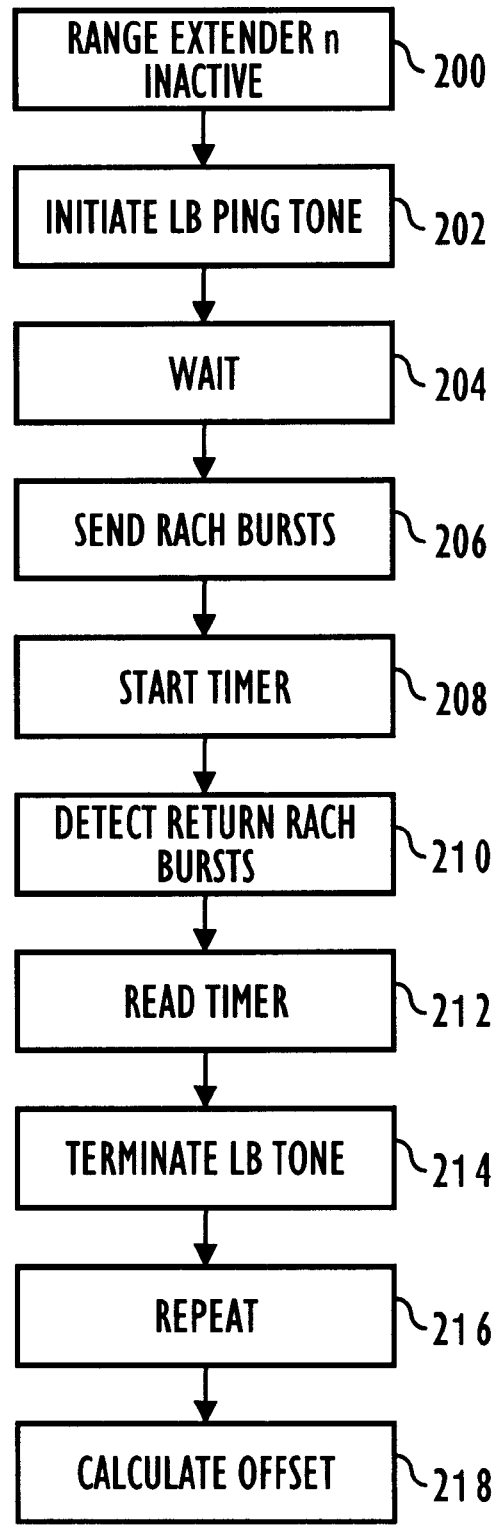
FIG. 5 is a flow chart of the sequence of steps performed by a transmit control processor in the host BTS during a time of arrival measurement procedure.

FIG. 5 contains a flow chart of the steps performed by the BTS control processor 50 during the time of arrival measurement process for a particular translator 12. In a first step 200, a particular one of the in-band translators 12 has been detected as being inactive for the pre-determined period of time. In a next step 202, the associated transmit DSP 48 is requested to send initiate loop back ping signal. The following step 204 causes the processor 50 to enter a wait state for a pre-determined time frame, after which in step 206 DSP 44 is asked to send the RACCH burst signals.

In the next step 208, a timer is started with step 208 preferably occurring concurrently with step 206. In step 210, the return RACCH bursts are reported as being detected by the associated receiving DSP 44. In step 212, the timer data is read. In step 214, the terminate loop back ping signal is transmitted back to the in-band translator 12. In the final step 218 the offset time "t" is calculated by averaging the results of the repeated timing interval measurements and dividing by two. The process is repeated for each of the translators in the cluster 24 to determine a time interval measurement for each.

Figure 6:
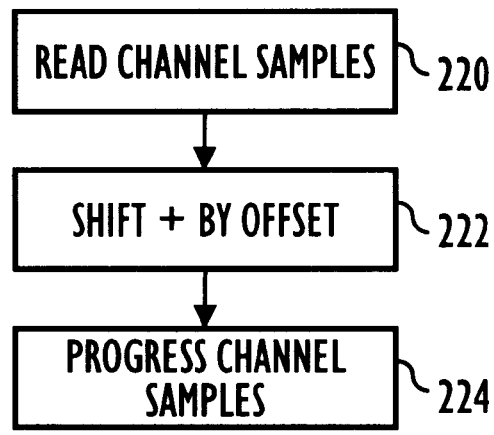
FIG. 6 is a flow chart of the sequence of steps performed by a receive digital signal processor in the host BTS while processing TDMA signal samples to compensate for the measured time of arrival.

FIG. 6 illustrates a sequence of steps performed by a receive DSP 44 during normal operation in connection with the invention. In a first step 220, the channel samples are read as in the normal demodulation processes as previously described. In a next step 222, the channel sample timing references are offset by the time "t" as determined from the process for the associated translator 12, as previously described in FIG. 5. In the next step 224, the channel samples are then further processed as for normal Time Division Multiple Access (TDMA) demodulation.

It is now understood how the invention is able to compensate for the propagation delay between the in-band translator 12 and the host BTS 15. Computer simulations of an implementation of the invention has been shown that with a single host BTS 15 and twelve cells 22, coverage can be provided of approximately 1000 square kilometers by a single BTS 15 which would previously have been limited to a radius of 35 kilometers.

This is accomplished by determining a fixed timing offset parameter for each in-band translator, by setting the in-band translator into a loop back mode via a transmission of a special loop back signal, transmitting an access burst as would normally be sent by a mobile unit, measuring the time of arrival delay at the BTS, and then using this measured time of arrival delay to determine an offset to be used to adjust the normal mode TDMA-demodulation processing.

What is claimed is:

1. A wireless communication system comprising a plurality of cells, the plurality of cells being located substantially adjacent one another, and the wireless communication system operating over a specified frequency range, the wireless communication system making use of a frequency allocation plan that arranges the cells into clusters, said wireless communication system comprising:

home base station means including a broadband Base Transceiver System for receiving and transmitting multiple radio signals on multiple respective carrier frequencies, including means for demodulating said received radio signals and for coupling demodulated signals to a switching means, and means for modulating signals received from the switching means and coupling them for radio transmission on the multiple carrier frequencies;

a plurality of in band translator means, each of said plurality of in band translator means located in a respective one of the plurality of cells in the cluster, each of said plurality of in band translator means including in a normal mode, first translator means for receiving a first ground signal from a mobile station located in the associated cell and translating a carrier frequency of said first ground signal to another carrier frequency within the specified radio frequency range to produce a first backhaul signal and then connecting said first backhaul signal for transmission to the home base station means, each of said plurality of in band translator means also including second translator means for receiving a second backhaul signal from said home base station means and translating a carrier frequency of said second backhaul signal to another carrier frequency within the specified radio frequency range, to produce a second ground signal, and then connecting said second ground signal for transmission to said mobile station, each of said plurality of in band translator means additionally including loop back means selectively actuable to select a loop back mode during which said second ground signal is connected to an input of said first translator means.

2. A system as in claim 1 including loop back signal detector means for activating said loop back means to said loop back mode in response to receiving an initiate loop back signal.

3. A system as in claim 2 wherein said loop back signal detection means additionally deactivates said loop back means in response to receiving a terminate loop back signal.

4. A system as in claim 3 wherein the terminate loop back signal is transmitted as part of the second backhaul signal.

5. A system as in claim 2 wherein the initiate loop back signal is transmitted as part of the second backhaul signal.

6. A system as in claim 5 wherein said home base station means additionally comprises:

means for transmitting the initiate loop back signal to each of said plurality of in band translator means;

means for transmitting a timing test signal as part of the second backhaul signal subsequent to transmitting the initiate loop back signal;

means for detecting the timing test signal as part of the first backhaul signal; and means for determining a loop back time of arrival estimate for said timing test signal.

7. A system as in claim 6 wherein said demodulating means in said home base station means further comprises means for adjusting a time delay in the demodulated signals in accordance with the time of arrival estimate.

8. A system as in claim 1 wherein each cluster contains twelve cells positioned about the home base station means, and a pattern of cells formed thereby is repeated throughout a service area.

* * * * *